US009152023B2

United States Patent
Lee

(10) Patent No.: US 9,152,023 B2
(45) Date of Patent: Oct. 6, 2015

(54) LIGHT SOURCE COOLING DEVICE INCLUDING HOLDING PART LOCATED ON SURFACE OF A CASE AND PROJECTION TYPE DISPLAY DEVICE

(75) Inventor: Junsi Lee, Tokyo (JP)

(73) Assignee: NEC DISPLAY SOLUTIONS, LTD., Tokyo (JP)

( * ) Notice: Subject to any disclaimer, the term of this patent is extended or adjusted under 35 U.S.C. 154(b) by 544 days.

(21) Appl. No.: 13/375,764

(22) PCT Filed: Jun. 18, 2009

(86) PCT No.: PCT/JP2009/061088
§ 371 (c)(1),
(2), (4) Date: Dec. 1, 2011

(87) PCT Pub. No.: WO2010/146682
PCT Pub. Date: Dec. 23, 2010

(65) Prior Publication Data
US 2012/0086920 A1      Apr. 12, 2012

(51) Int. Cl.
*G03B 21/16*     (2006.01)
*G03B 21/20*     (2006.01)

(52) U.S. Cl.
CPC .............. *G03B 21/16* (2013.01); *G03B 21/20* (2013.01); *G03B 21/2026* (2013.01); *G03B 21/2086* (2013.01); *G03B 21/2093* (2013.01)

(58) Field of Classification Search
CPC .... G03B 21/16; G03B 21/20; G03B 21/2026; G03B 21/2086; G03B 21/2093
USPC ................. 353/52, 55, 56, 57, 58, 59, 60, 61
See application file for complete search history.

(56) References Cited

U.S. PATENT DOCUMENTS

| 7,380,965 | B2 * | 6/2008 | Nakashita | 362/373 |
| 7,384,156 | B2 * | 6/2008 | Suzuki | 353/61 |
| 7,513,626 | B2 * | 4/2009 | Adachi et al. | 353/60 |
| 7,553,030 | B2 * | 6/2009 | Suzuki | 353/57 |
| 7,891,846 | B2 * | 2/2011 | Noda | 362/373 |

(Continued)

FOREIGN PATENT DOCUMENTS

| JP | 2003-43583 A | 2/2003 |
| JP | 2003-157714 A | 5/2003 |

(Continued)

OTHER PUBLICATIONS

International Search Report (ISR) (PCT Form PCT/ISA/210) dated Jul. 14, 2009, in PCT/JP2009/061088.

*Primary Examiner* — Bao-Luan Le
(74) *Attorney, Agent, or Firm* — McGinn IP Law Group, PLLC.

(57) ABSTRACT

Provided is a light source cooling device that includes: a case in which exhaust port (112) is formed; ventilation device (102) that has a blowing port blowing air and that is located in the case; flow path component (301); light source (101); and holding part (121) disposed in an inner surface of case (108). Flow path component (301) constitutes flow path (403) for guiding air from ventilation device (102) to exhaust port (112) in the case. Light source (101) is located in flow path (403). Flow path component (301) includes a first opening and a second opening. The first opening is connected to exhaust port (112), while the second opening is connected to the blowing port of ventilation device (102). An outer surface of flow path component (301) is held by holding part (121).

20 Claims, 13 Drawing Sheets

(56) References Cited

U.S. PATENT DOCUMENTS

| | | | |
|---|---|---|---|
| 2003/0081185 A1 | 5/2003 | Nakano et al. | |
| 2005/0213050 A1* | 9/2005 | Suzuki | 353/58 |
| 2006/0062001 A1* | 3/2006 | Nakashita et al. | 362/345 |
| 2006/0062670 A1* | 3/2006 | Suzuki | 416/63 |
| 2006/0170876 A1* | 8/2006 | Takemi et al. | 353/61 |
| 2007/0229776 A1* | 10/2007 | Suzuki | 353/57 |
| 2008/0049193 A1* | 2/2008 | Zheng et al. | 353/57 |
| 2008/0088806 A1* | 4/2008 | Yoshii | 353/119 |
| 2008/0174743 A1* | 7/2008 | Nakashita et al. | 353/57 |
| 2009/0244491 A1* | 10/2009 | Wang et al. | 353/61 |

FOREIGN PATENT DOCUMENTS

| | | |
|---|---|---|
| JP | 2004-170541 A | 6/2004 |
| JP | 2004-205714 A | 7/2004 |
| JP | 2005-24867 A | 1/2005 |
| JP | 2005-156748 A | 6/2005 |
| JP | 2005-283841 A | 10/2005 |
| JP | 2007-272040 A | 10/2007 |
| JP | 2007-322823 A | 12/2007 |
| JP | 2008-26732 A | 2/2008 |
| JP | 2008-281952 A | 11/2008 |
| JP | 2009-63671 A | 3/2009 |

* cited by examiner

LIGHT SOURCE COOLING DEVICE INCLUDING HOLDING PART LOCATED ON SURFACE OF A CASE AND PROJECTION TYPE DISPLAY DEVICE

TECHNICAL FIELD

The present invention relates to a light source cooling device that includes a ventilation device for cooling a light source, and a projection type display device.

BACKGROUND

One of known light source cooling devices is a device that includes a case, a light source located in the case, and a ventilation device. For the light source that generates heat, for example, a high-pressure mercury lamp is used. The light source generates heat when used. Hence, it is cooled by using a ventilation device such as a fan. The light source cooling device is applied to a projection type display device such as a projector.

In the case of cooling the light source by using the fan, air warmed by the light source is blown to a component disposed on the downstream side of the light source in a flowing direction of the air blown from the fan. This increases the temperature of the component. When the air warmed by the light source is blown to an inner surface of the case, the temperature of the case increases. The increased temperature of the case creates a problem in which the user experiences discomfort when touching the case.

In order to solve the problem, JP2004-170541A (hereinafter, Patent Literature 1) discusses a projector that includes a fan to cool a lamp. The lamp and the fan are housed in a case in which an exhaust port is formed. In this projector, wind is blown to the lamp from the fan disposed in the case. This wind is discharged out of the case through the exhaust port.

In order to prevent an increase in the temperature of the case, the projector discussed in Patent Literature 1 includes a partition plate located between an inner surface of the case and the lamp so as to prevent air warmed by the lamp from being directly blown to the inner surface of the case. A passage is formed between the partition plate and the case. The flow of air blown from the fan is branched into a space where the lamp is located and into the passage between the partition plate and the case. In the flowing direction of the air blown from the fan, the space on the downstream side of the lamp is connected to the passage between the partition plate and the case. The air that passed through the space where the lamp is located and the air that passed through the passage between the partition plate and the case are discharged from the case through the same exhaust port.

CITATION LIST

Patent Literature

Patent Literature 1: JP2004-170541A

SUMMARY

Technical Problem

In the projector discussed in Patent Literature 1, in the flowing direction of the air blown from the fan, the space on the downstream side of the lamp is connected to the passage between the partition plate and the case. This may cause the air warmed by the lamp to flow into the passage between the case and the partition plate. Consequently, when the projector is in use, air that is warmed by the lamp touches the case and thus the temperature of the case may increases.

Generally, the user cannot recognize the position of the light source in the case or the position of the exit path of the warmed air. The temperature of the surface of the wall of the case that is in contact with the light source or that is in contact with the exit path of the air increases. However, the user cannot recognize this increased temperature. It is particularly difficult for the user to recognize an increase in the temperature of a case portion that is located away from the air exhaust port. Thus, the user who touches the wall surface of the case whose temperature has increased feels uncomfortable due to the unexpected high temperature.

Usually, to reduce the noise of the fan, the rotational speed of the fan is set as low as possible. However, the lower rotational speed of the fan leads to a reduction in the cooling efficiency of the light source.

When the case is made of a white resin material, the high temperature of the resin material causes the case to turn yellow. To solve the problem of color change, a material can be mixed into the resin material to prevent any color change, or white paint can be applied to the surface of the case. However, these measures increase the manufacturing costs of the light source cooling device.

It is therefore desirable that any increase in temperature of the case of the light source cooling device be prevented while the light source cooling device is being used.

Solution to Problem

The present invention provides a light source cooling device and a projection type display device that solve the above described problems.

A light source cooling device includes: a case in which an exhaust port is formed; a ventilation device that includes blowing port for blowing air and that is located in the case; a flow path component; a light source; and a holding part located in an inner surface of the case. The flow path component constitutes a flow path for guiding the air from the ventilation device to the exhaust port in the case. The light source is located in the flow path. The flow path component includes a first opening and a second opening. The first opening is connected to the exhaust port of the case while the second opening is connected to the blowing port of the ventilation device. The outer surface of the flowing path component is held by the holding part.

A projection type display device projects light emitted from a light source as an image. The projection type display device includes: a case in which an exhaust port is formed; a ventilation device that includes a blowing port for blowing air and that is located in the case; a flow path component; and a holding part located in an inner surface of the case. The flow path component constitutes a flow path for guiding the air from the ventilation device to the exhaust port in the case. The light source is located in the flow path. The flow path component includes a first opening and a second opening. The first opening is connected to the exhaust port of the case while the second opening is connected to the blowing port of the ventilation device. An outer surface of the flowing path component is held by the holding part.

The above and other objects, features and advantages of the present invention will be apparent from the following detailed description of the invention in conjunction with the accompanying drawings.

DESCRIPTION OF EMBODIMENTS

The preferred embodiments of the present invention are described with reference to the accompanying drawings. In the embodiments below, as an example of a light source cooling device, a projection type display device is described in detail. However, the present invention is not limited to the projection type display device. The invention can be applied to general light source cooling devices that include a ventilation device for cooling light sources.

Figure 1:
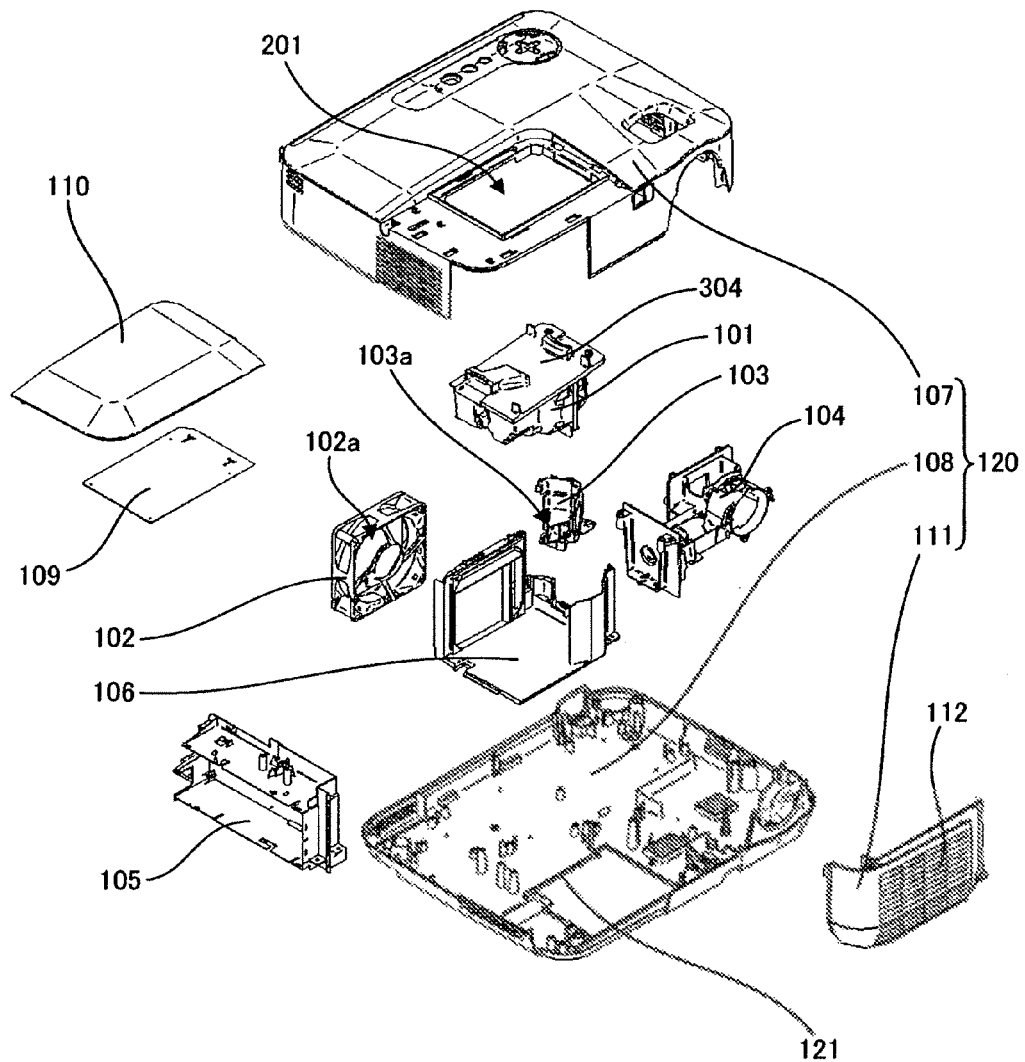
FIG. 1 is an exploded perspective view showing a projection type display device according to a first embodiment of the present invention.

FIG. 1 is an exploded perspective view showing a projection type display device according to a first embodiment of the present invention. The projection type display device includes light source 101, a ventilation device having a blowing port, and case 120 for housing light source 101 and the ventilation device. In the embodiment, first fan blower 102 and second fan blower 103 constitute the ventilation device. First fan blower 102 and second fan blower 103 respectively include blowing ports 102a and 103a for blowing air. For light source 101, for example, a high-pressure mercury lamp can be used.

The projection type display device includes optical engine 104, connector holder 105, and support 106 for supporting the ventilation device and optical engine 104. Connector holder 105 includes an electrode terminal to which a connector for supplying power to light source 101 is connected. Optical engine 104 includes a lens system for processing light emitted from light source 101. In the projection type display device, optical engine 104 includes an element for converting the light into an image and a projection lens for projecting the light.

In the embodiment, case 120 is constructed by assembling first case portion 107, second case portion 108, and exhaust cover 111. Light source 101, fan blowers 102 and 103, optical engine 104, and connector holder 105 are supported by support 106 to be housed in case 120.

Exhaust cover 111 includes exhaust port 112. Exhaust port 112 has, for example, a slit-shaped opening. Air from fan blowers 102 and 103 is blown to light source 101, and then discharged from case 120 through exhaust port 112.

Figure 2:
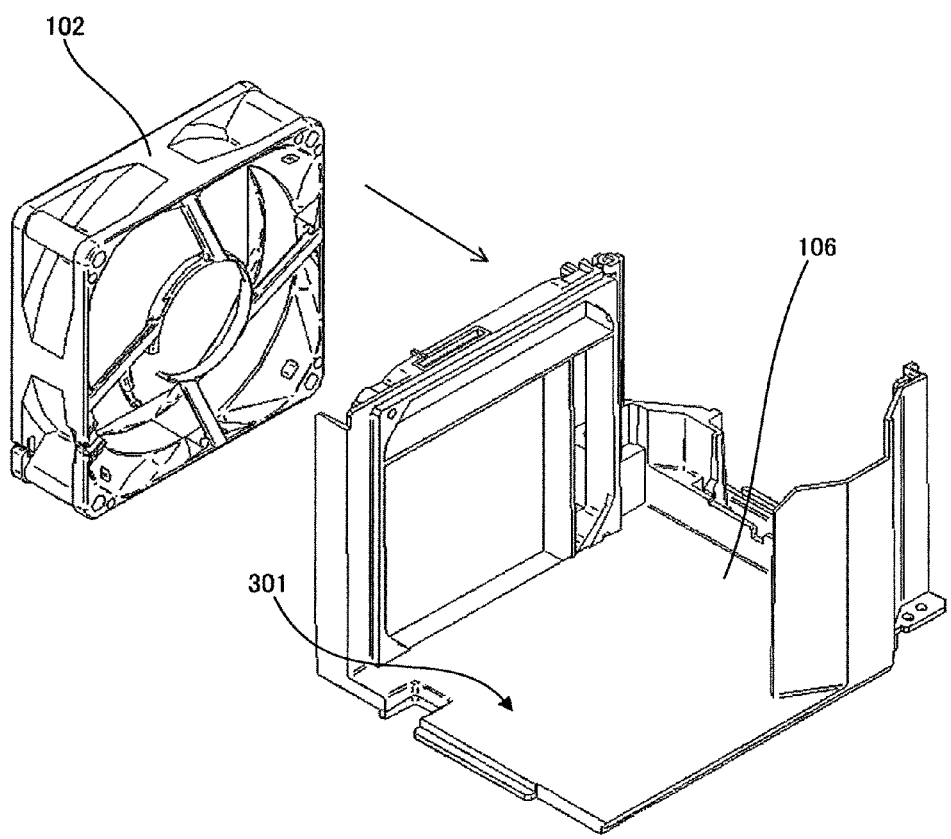
FIG. 2 is an exploded perspective view showing a support and a first fan blower.

FIG. 2 is an exploded perspective view showing support 106 and first fan blower 102. Support 106 supports first fan blower 102 (refer to FIG. 2). First fan blower 102 is attached firmly to support 106.

Light source 101 is located on the downstream side of fan blowers 102 and 103 in a flowing direction of the fans. Fan blowers 102 and 103 blow air to light source 101. Support 106 has wall portion 301 along an air flow from fan blowers 102 and 103.

Figure 3:
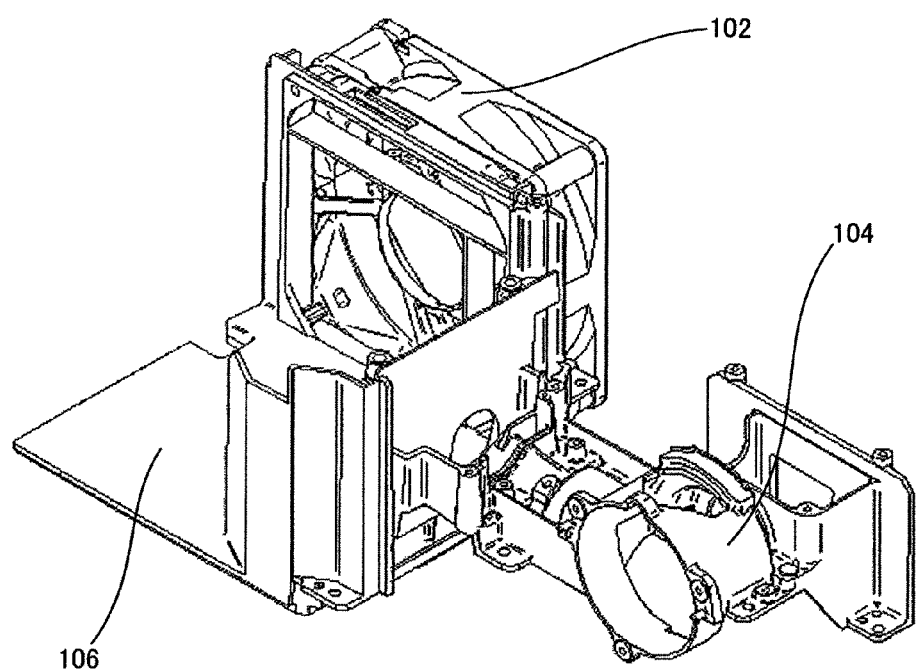
FIG. 3 is a perspective view showing a connected state of the support, the first fan blower, and an optical engine.
Figure 4:
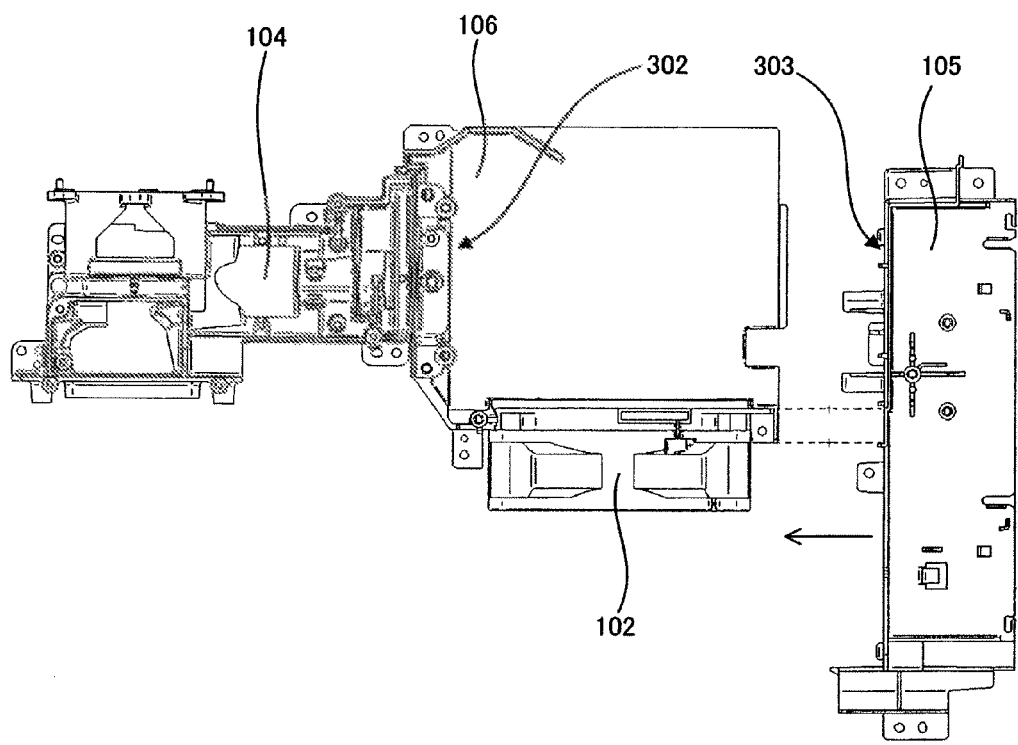
FIG. 4 is a plan view showing the support, the first fan blower, the optical engine, and a connector holder.

As shown in FIG. 3, optical engine 104 is attached to support 106. As shown in FIG. 4, connector holder 105 is attached to support 106 and first fan blower 102.

Figure 5:
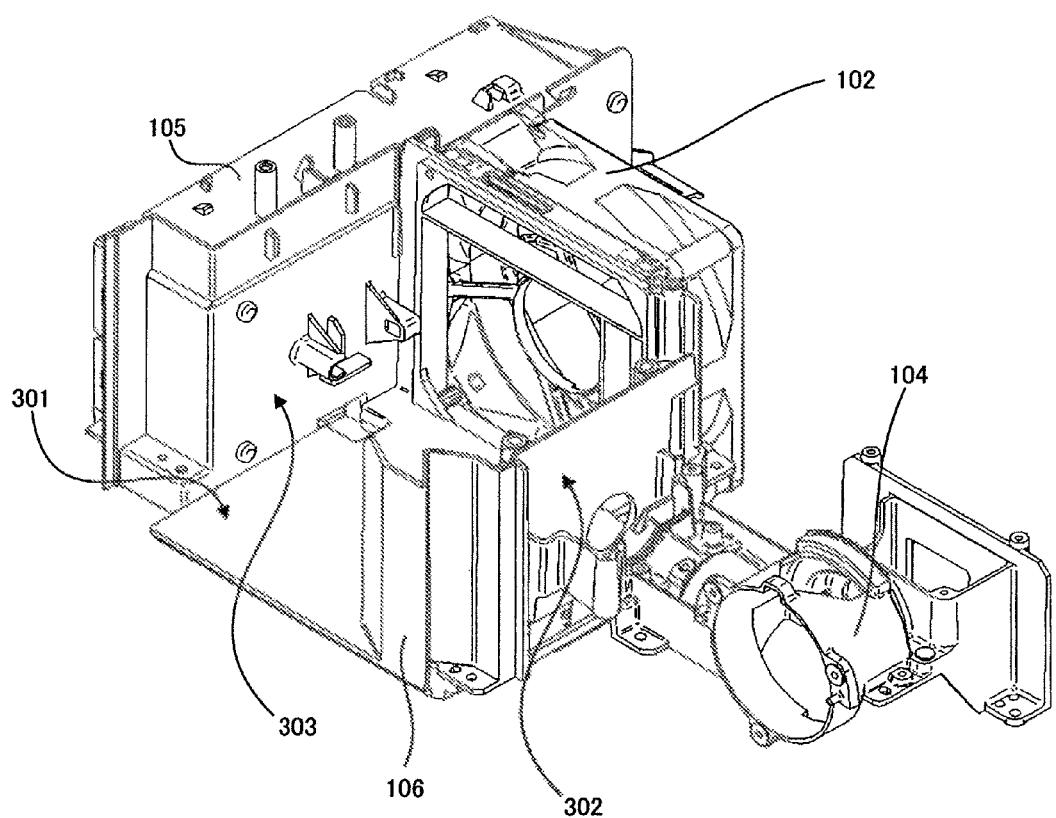
FIG. 5 is a perspective view showing a connected state of the support, the first fan blower, the optical engine, and the connection holder.

As shown in FIG. 5, optical engine 104 and connector holder 105 respectively include wall portions 302 and 303 along the pass that air, that is blown from fan blowers 102 and 103, flows. In the embodiment, wall portion 301 of the support, wall portion 302 of the optical engine, and a wall portion 303 of the connector holder are engaged with one another without any gap between the wall portions to form a roughly U-shaped wall (refer to FIG. 5).

Figure 6:
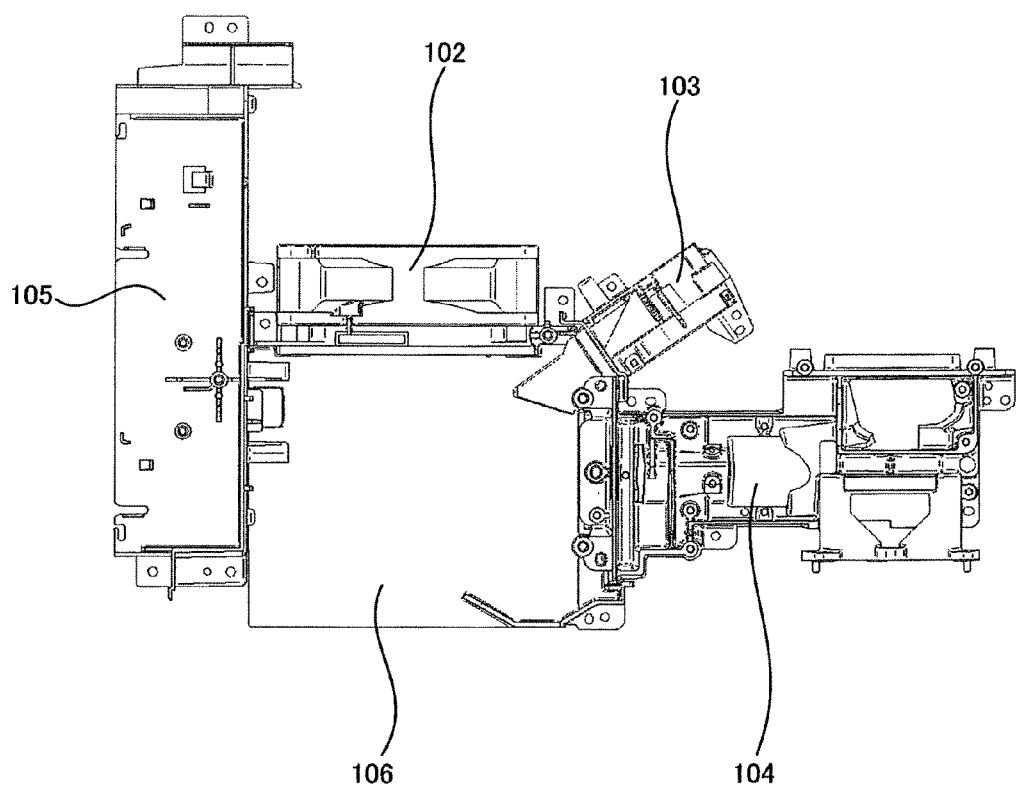
FIG. 6 is a plan view showing a connected state of the support, the optical engine, the connector holder, the first fan blower, and a second fan blower.

As shown in FIG. 6, second fan blower 103 for cooling light source 101 is engaged with support 106, first fan blower 102, and optical engine 104 without any gap. Thus, air sent from fan blowers 102 and 103 can be prevented from leaking through any engaged portion.

In the embodiment, for the ventilation device that blows air to cooling device 101, two fan blowers 102 and 103 are used. However, the number of fan blowers can be one, or at least three.

Figure 7:
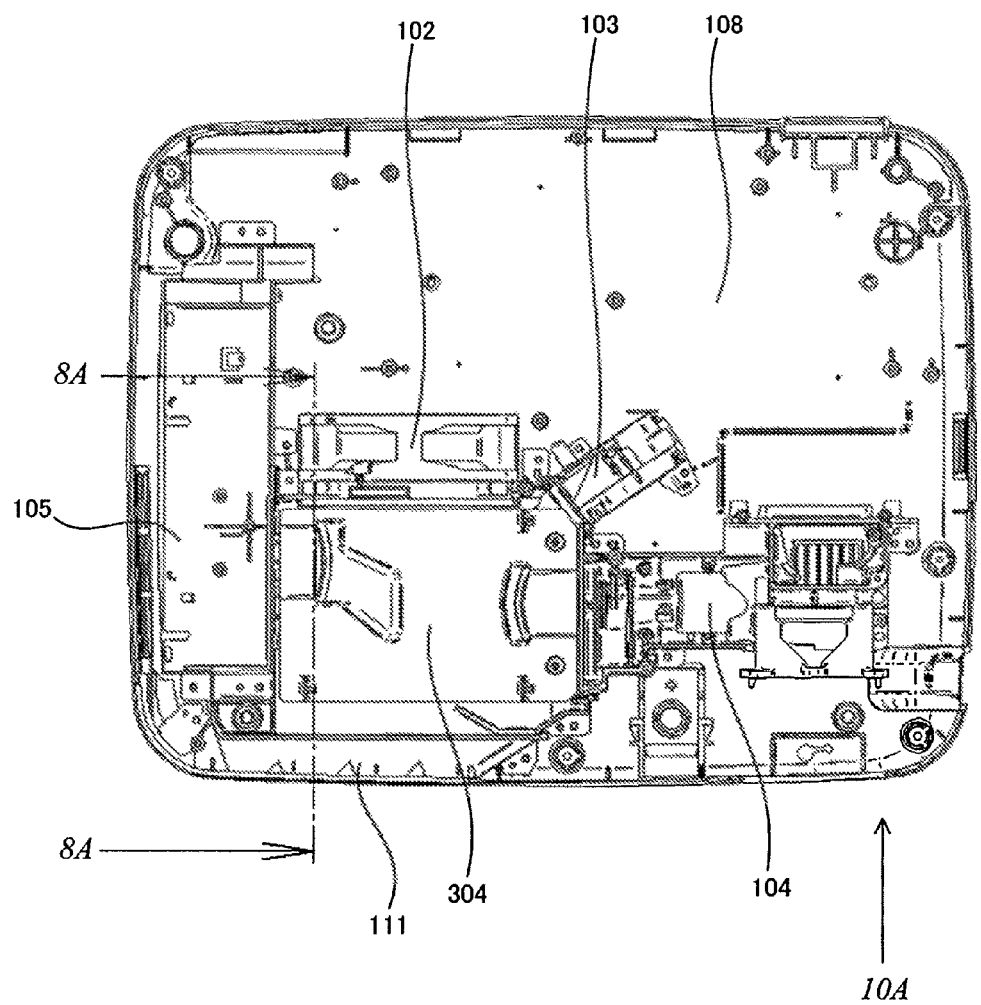
FIG. 7 is a plan view showing a projection type display device in a removed state of a first case portion.
Figure 8:
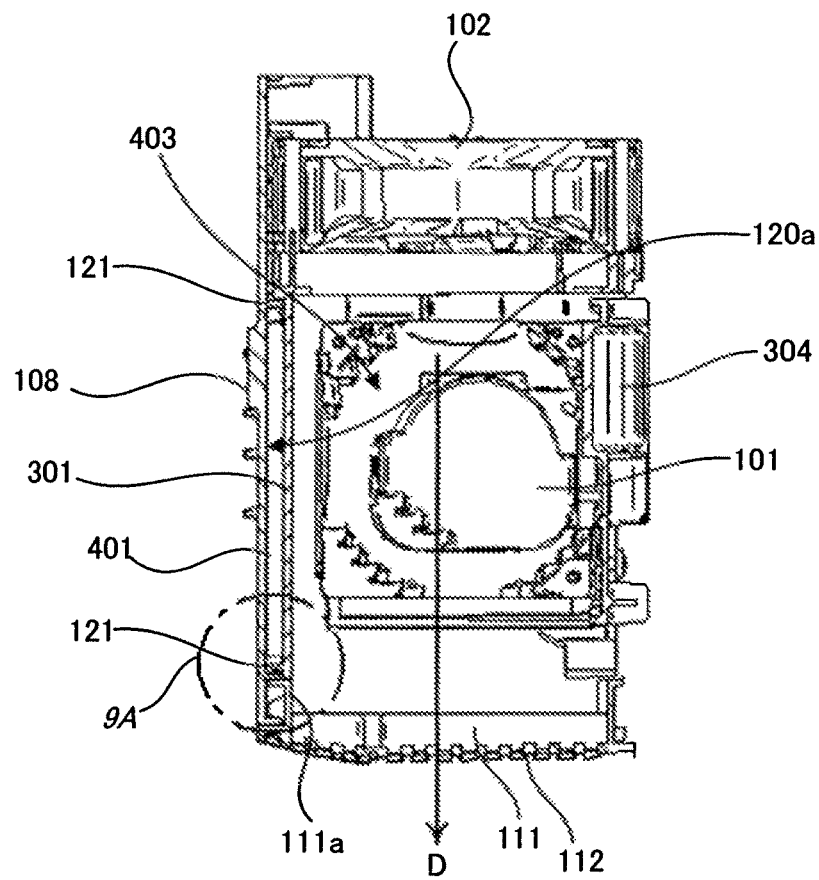
FIG. 8 is a sectional view taken along line 8A-8A of the projection type display device shown in FIG. 7.
Figure 9:
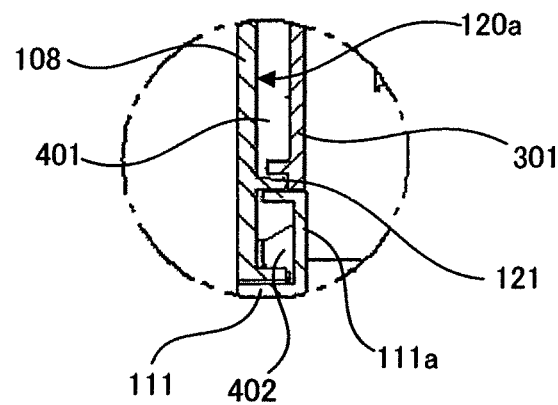
FIG. 9 is an enlarged view showing area 9A shown in FIG. 8.

FIG. 7 is a plan view schematically showing the projection type display device in a removed state of first case portion 107. FIG. 8 is a schematic sectional view taken along line 8A-8A of the projection type display device shown in FIG. 7. FIG. 9 is an enlarged view schematically showing area 9A shown in FIG. 9.

Light source 101 is held on wall portion 304 along the path along which the air flows from fan blowers 102 and 103 (also refer to FIG. 1). Wall portion 304 is connected to wall portion 302 of the optical engine and wall portion 303 of the connector holder without any gap. Thus, wall portion 301 of the support, wall portion 302 of the optical engine, wall portion 303 of the connector holder, and wall portion 304 for holding the light source are cylindrically interconnected to form a flow path component. The flow path component constitutes flow path 403 for guiding the air from fans 102 and 103 to exhaust port 112. An outer surface of the flow path component is held by holding part 121 formed on an inner surface of case 120. Light source 101 is located in flow path 403.

In the embodiment, wall portions 301, 302, 303, and 304 of the flow path component are engaged with one another without any gap between them. This prevents leakage of the air from flow path 403. However, not limited to the abovementioned form, wall portions 301, 302, 303, and 304 of the flow path component just need to be interconnected firmly to prevent leakage of the air from flow path 403.

In the embodiment, the flow path component includes a first opening, a second opening, and a third opening. The first opening is connected to exhaust port 112 of the case. The second opening is connected to blowing port 102a of the first fan blower. The third opening is connected to blowing port 103a of the second fan blower.

With the abovementioned configuration, air D blown from fan blowers 102 and 103 is guided to exhaust port 112 of the case without leaking from the flow path component. Thus, temperature increases at case portions 107 and 108 other than exhaust cover 111 are suppressed, and discomfort that the user experiences can be prevented.

When the projection type display device includes only one fan blower as the ventilation device, the flow path component needs to have only two openings. In this case, one opening is connected to an exit port of the case, and to the other opening.

Thus, the number of openings for the flow path component can be changed according to the number of fan blowers. A plurality of openings for the flow path components can be connected to the exit port of the case.

The flow path component is held by holding part 121. Hence, even when the temperature of the flow path component itself increases, its heat is not directly transmitted to case 120. Thus, an increase in the temperature of case 120 is prevented. Holding part 121 can be made of a heat insulating material in order to improve the effect in which the increase in the temperature of case 120 is prevented. Holding part 121 can be formed integrally with case 120.

Space 401 is formed between inner surface 120a of the case where holding part 121 is located and an outer surface of the flow path component. Specifically, space 401 is surrounded with the outer surface of the flow path component, inner surface 120a of the case, and holding part 121.

In the embodiment, frame-shaped holding part 121 for holding the flow path component is formed in one surface 120a of an inner wall of second case portion 108. Wall portion 301 of support 106 is held by holding part 121. Thus, space 401 between inner surface 120a of the case and the outer surface of the flow path component prevents transmission of heat of the light source to the case, thereby preventing the temperature increase of the case.

Space 401 between wall portion 301 of the support constituting the flow path component and inner surface 120a of the case can be sealed with holding part 121 for holding the flow path component in the case. In this case, even when air that is warmed by light source 101 leaks from the flow path component, there is no possibility of air entering into space 401, and an increase in the temperature of case portions 107 and 108 is prevented.

As shown in FIG. 9, exhaust cover 111 includes projection portion 111a projected into the case. It is preferable that projection portion 111a be in contact with support 301 without any gap between projection portion 111a and support 301. Space 402 is formed between exhaust cover 111 and second case portion 108. Space 402 is formed between flow path 403 and second case portion 108, and hence an increase in the temperature of second case portion 108 is prevented.

Figure 10:
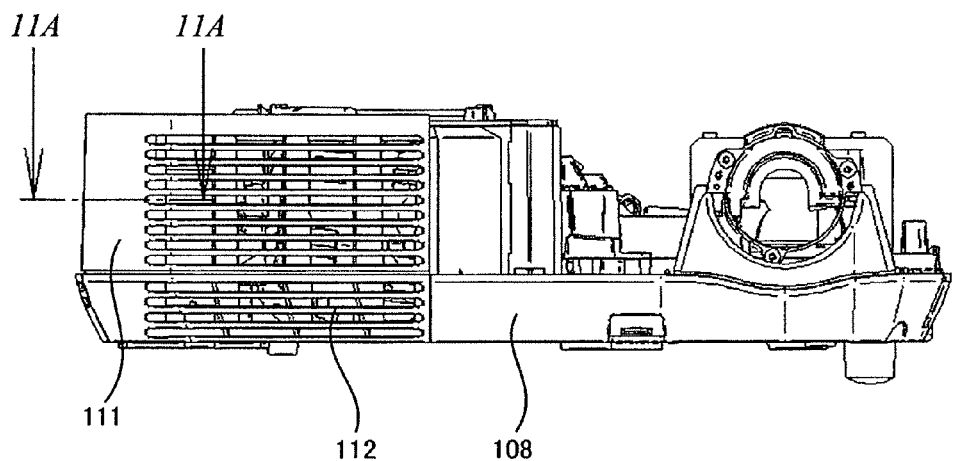
FIG. 10 is a plan view showing the projection type display device seen from a direction 10A shown in FIG. 7.
Figure 11:
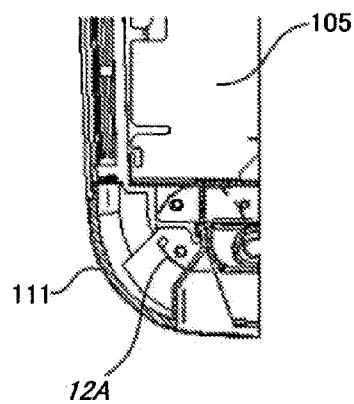
FIG. 11 is a sectional view taken along line 11-11A of the projection type display device shown in FIG. 10.
Figure 12:
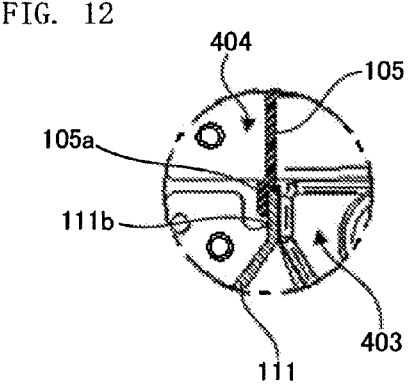
FIG. 12 is an enlarged view showing area 12A shown in FIG. 11.

FIG. 10 is a plan view showing the projection type display device seen from direction 10A shown in FIG. 7. FIG. 11 is a sectional view taken along line 11-11A of the projection type display device shown in FIG. 10. FIG. 12 is an enlarged view showing area 12A shown in FIG. 11.

The flow path component extends toward exhaust cover 111. It is preferable that the end of the flow path component on the exhaust port side be firmly attached to exhaust cover 111 without any gap between the flow path component of the exhaust port side and exhaust cover 111. Flow path 403 communicates with the outside of case 120 via exhaust port 112. Thus, the air in flow path 403 is prevented from flowing into the other space 404 in the case.

Specifically, engaging portion 105a is formed at an end of connector holder 105 included in the flow path component on the exhaust port side. Exhaust cover 111 includes engaging portion 111b projected into case 120. Engaging portion 105a of the connector holder and engaging portion 111b of exhaust cover 111 are engaged with each other without any gap between them.

This configuration prevents the air in flow path 403 from being directly blown to first and second case portions 107 and 108. Hence, temperature increases in case portions 107 and 108 that are located away from exhaust port are suppressed.

Air warmed by light source 101 in the flow path is directly blown to exhaust cover 111. Thus, it is preferable that exhaust cover 111 be made of a highly heat-resistant material and/or a highly discoloration-resistant material.

An increase in the temperature of first and second case portions 107 and 108 is prevented, and hence first and second case portions 107 and 108 can be made of materials whose heat resistance characteristics are lower than those of exhaust cover 111. First and second case portions 107 and 108 can be made of materials whose discoloration resistance characteristics are lower than those of exhaust cover 111. In other words, for example, white resins can be used for first and second case portions 107 and 108.

Thus, the available choice of materials for first and second case portions 107 and 108 is increased. As a result, manufacturing costs of the projection type display device can be reduced.

It is preferable that the flow path component include only components essential to the projection type display device. In other words, it is preferable that another member (e.g., cushion) for interconnecting the components is not installed. This reduces the number of components for the projection type display device. As a result, manufacturing costs of the projection type display device can be reduced.

Figure 13:
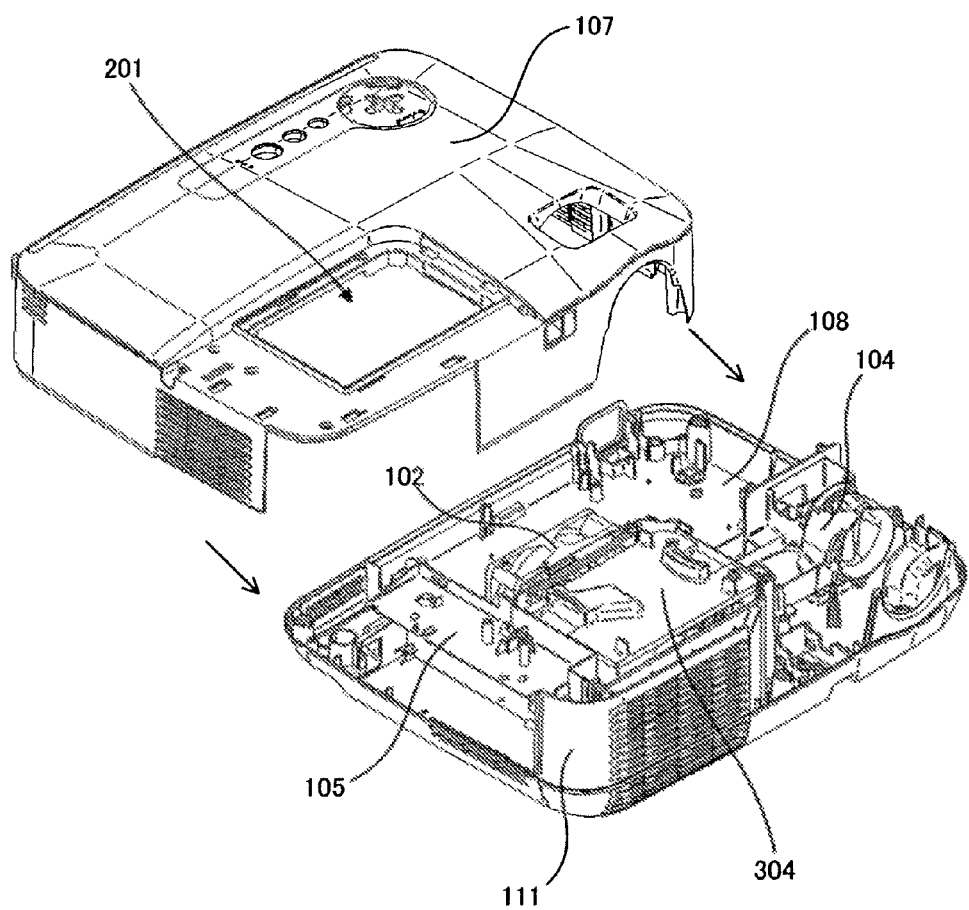
FIG. 13 is a perspective view of the projection type display device showing an internal structure of a case.
Figure 14:
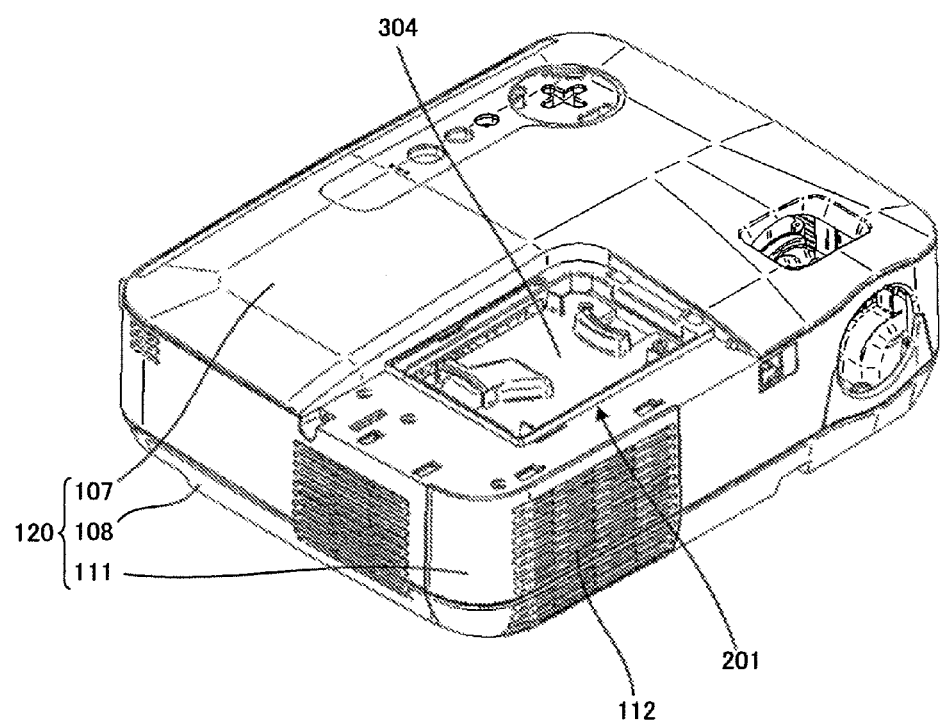
FIG. 14 is a perspective view showing the projection type display device in a removed state of a first cover and a second cover.

FIG. 13 is an exploded view showing the projection type display device in an exploded state of first case portion 107. FIG. 14 is an exploded view showing the projection type display device. In FIGS. 13 and 14, first and second covers 109 and 110 are not shown.

It is preferable that first case portion 107 include opening 201 that is formed large enough to pass through light source 101. Opening 201 is aligned with light source 101 so that light source 101 can be replaced.

Figure 15:
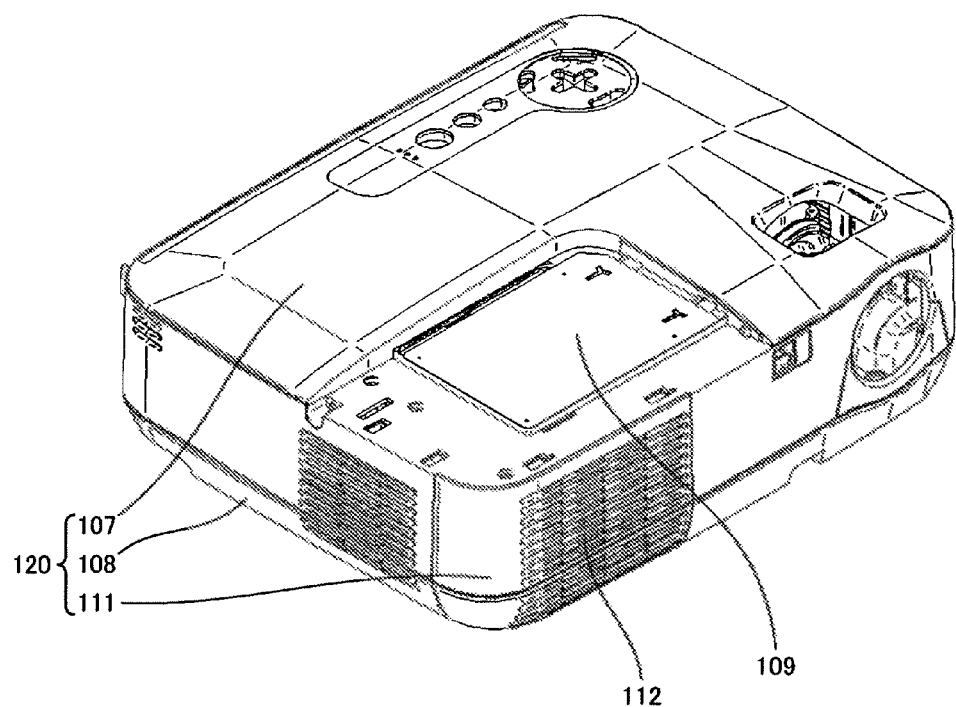
FIG. 15 is a perspective view showing the projection type display device in a removed state of the second cover.

As shown in FIG. 15, to cover opening 201 of the case, first cover 109 can be detachably attached to case 120. To cover entire first cover 109, second cover 110 can be detachably attached to case 120. When luminous efficiency of light source 110 decreases, by removing first and second covers 109 and 110, light source 101 can be replaced through opening 201 of the case.

In the embodiment, first and second cover 109 and 110 are detachable from case 120. Alternatively, first cover 109 and second cover 110 can be opened and closed.

Figure 16:
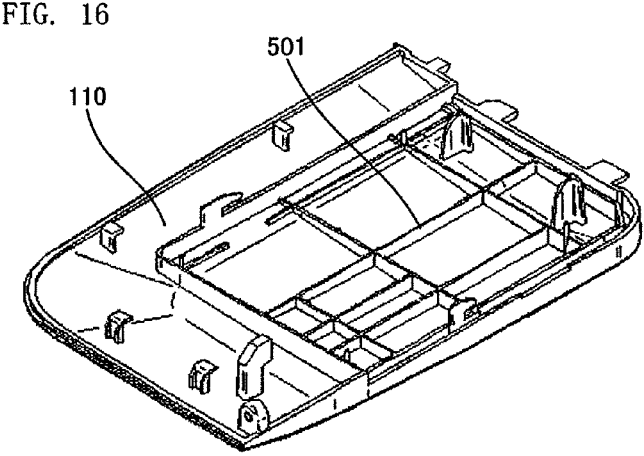
FIG. 16 is perspective view showing a surface of the second cover directed to an inner side of the case.
Figure 17:
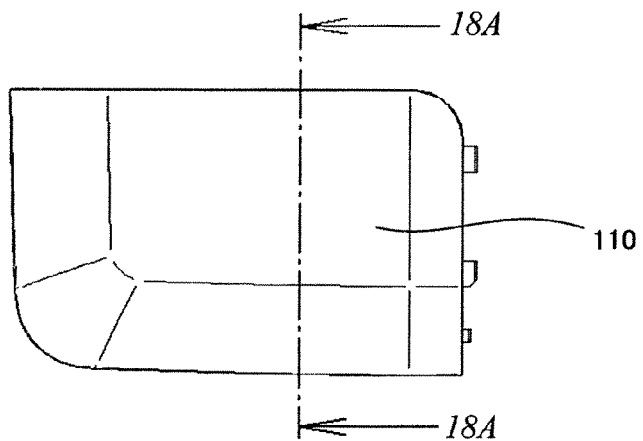
FIG. 17 is a plan view showing the second cover that covers the first cover.
Figure 18:
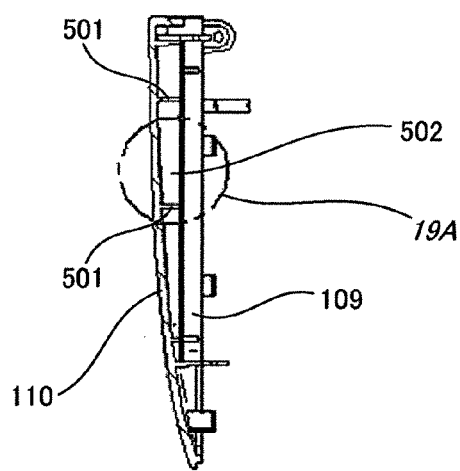
FIG. 18 is a sectional view taken along line 18A-18A of the first and second covers shown in FIG. 17.
Figure 19:
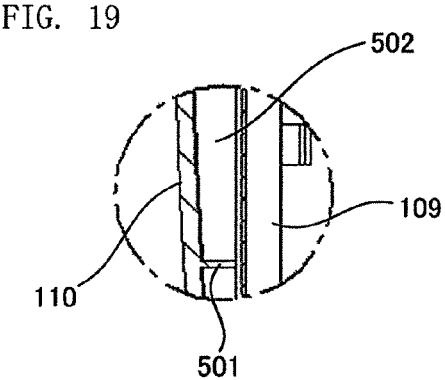
FIG. 19 is an enlarged view showing area 19A shown in FIG. 18.

FIG. 16 is a plan view showing a surface of second cover 110 directed to the inside of the case. FIG. 17 is a plan view showing second cover 110 that covers first cover 109. FIG. 18 is a sectional view taken along line 18A-18A shown in FIG. 17. FIG. 19 is an enlarged view showing area 19A shown in FIG. 18.

Projection portion 501 is formed on the surface of second cover 110 directed to the inside of the case. First cover 109 is in contact with projection portion 501 of the second cover. Gap 502 is formed between first cover 109 and second cover 110. Gap 502 functions as heat insulating material to prevent a temperature increase of second cover 110 exposed to an outer surface of the projection type display device. It is preferable that gap 502 between first cover 109 and second cover 110 be sealed.

First cover 109 is located away from light source 101. However, the temperature of first cover 109 may increase due to the influence of light or ultraviolet rays leaked from light source 101. Even in this case, the temperature increase of second cover 101 is prevented by gap 502 between first cover 109 and second cover 110. Thus, any discomfort that is experienced by a user touching the projection type display device is reduced.

First cover 109 and second cover 110 can be made of separate members, or can be integrally formed. The integral formation of first cover 109 and second cover 110 is advantageous in that a cover for opening 201 to replace light source 101 is made of a single member.

In the embodiment, each of the components such as light source 101, optical engine 104, and connection holder 105 is made of a single member. However, the components can be made of a plurality of members. The location of each of the components constituting the flow path component is not limited to the example of the embodiment described above, but can be changed if other locations are available.

In the embodiment, the flow path component is constructed by cylindrically connecting the wall portion for holding the light source, the wall portion of the optical engine, the wall portion of the connector holder, and the wall portion of the support. However, when not needed for the light source cooling device, the optical engine, the connector holder, and the support can be removed. In this case, the only requirement is that the flow path component includes a plurality of components having wall portions along the path along which the air flows from the ventilation device, and that the wall portions of the plurality of components be cylindrically connected.

The preferred embodiments of the present invention have been described in detail. However, the present invention is not limited to the embodiment. Various changes and modifications can be made without departing from the spirit and the scope of the invention.

REFERENCE SIGNS LIST 101 light source
102 first fan blower
102a blowing port of first fan blower
103 second fan blower
103a blowing port of second fan blower
104 optical engine
105 connector holder
106 support
107 first case portion
108 second case portion
109 first cover
110 second cover
111 exhaust cover
111a engaging portion of exhaust cover
112 exhaust port
120 case
120a inner surface of case
121 holding part
201 opening
301 wall portion of support
302 wall portion of optical engine
303 wall portion of connector holder
304 wall portion holding light source
401 space between support and case
402 space between exhaust cover and case
403 flow path
404 space
501 projection portion
502 gap between first cover and second cover

The invention claimed is:

1. A light source cooling device, comprising:
a case in which an exhaust port is formed;
a ventilation device that includes a blowing port for blowing air and that is located in the case;
a flow path component constituting a flow path guiding the air from the ventilation device to the exhaust port in the case;
a light source located in the flow path;
a holding part located on an inner surface of the case,
wherein the case includes an opening for accessing the light source, the opening being aligned with a position in the case where the light source is located,
wherein a first cover for covering the opening for accessing the light source is provided,
wherein the flow path component includes a first opening and a second opening,
wherein the first opening is connected to the exhaust port of the case while the second opening is connected to the blowing port of the ventilation device, and
wherein an outer surface of the flow path component is held by the holding part provided in a different region from a region in which the first cover is provided; and
a space formed by the outer surface of the flow path component, the inner surface of the case, and the holding part,
wherein the holding part is formed in a frame shape for surrounding the space.

2. The light source cooling device according to claim 1, wherein the flow path component includes a plurality of components including wall portions along a path along which air flows from the ventilation device, and the wall portions of the plurality of components are cylindrically interconnected.

3. The light source cooling device according claim 2, wherein connection portions for interconnecting the wall portions of the plurality of components are attached to one another without any gap between them.

4. The light source cooling device according to claim 1, wherein the case includes an exhaust cover in which the exhaust port is formed, and
wherein the exhaust cover is attached to an end of the flow path component on an exhaust port side.

5. The light source cooling device according to claim 4, wherein the exhaust cover includes an engaging portion projected toward an inside of the case, and
wherein the engaging portion of the exhaust cover is engaged with the flow path component.

6. The light source cooling device according to claim 4, wherein the case includes a case portion comprising a member different from that of the exhaust cover, and
wherein the case portion comprises a material whose heat resistance characteristics are lower than heat resistance characteristics of a material of the exhaust cover.

7. The light source cooling device according to claim 1, further comprising a second cover to cover the first cover so that a gap is formed between the second cover and the first cover.

8. The light source cooling device according to claim 1, wherein the holding part is formed integrally with the case.

9. The light source cooling device according to claim 1, wherein the opening for accessing the light source is positioned in a region of outside of the space surrounded by the holding part.

10. The light source cooling device according to claim 1, wherein the space is sealed by the outer surface of the flow path component, the inner surface of the case, and the holding part.

11. The light source cooling device according to claim 1, wherein the space is enclosed by the outer surface of the flow path component, the inner surface of the case, and the holding part such that, in a cross-sectional view, the holding part defines an upper wall of the space and a bottom wall of the space, and the outer surface of the flow path component and the inner surface of the case define side walls of the space extending between the upper wall of the space and the bottom wall of the space.

12. The light source cooling device according to claim 1, wherein the holding part includes a top surface and a bottom surface,
   wherein, in a cross sectional view of the light source cooling device, the space extends in a longitudinal direction between the top surface and the bottom surface of the holding part, and
   wherein, in the cross sectional view of the light source cooling device, the space extends in a width direction between the outer surface of the flow path component and the inner surface of the case.

13. The light source cooling device according to claim 1, wherein the holding part includes a top surface and a bottom surface,
   wherein, in a cross sectional view of the light source cooling device, the space continuously extends in a longitudinal direction between the top surface and the bottom surface of the holding part, and
   wherein, in the cross sectional view of the light source cooling device, the space continuously extends in a width direction between the outer surface of the flow path component and the inner surface of the case.

14. A projection type display device for projecting light emitted from a light source as an image, the projection type display device comprising:
   a case in which an exhaust port is formed;
   a ventilation device that includes a blowing port for blowing air and that is located in the case;
   a flow path component constituting a flow path guiding the air from the ventilation device to the exhaust port in the case;
   a holding part located in an inner surface of the case,
      wherein the case includes an opening for accessing the light source, the opening being aligned with a position in the case where the light source is located,
      wherein a first cover for covering the opening for accessing the light source is provided,
      wherein the light source is located in the flow path,
      wherein the flow path component includes a first opening and a second opening,
      wherein the first opening is connected to the exhaust port of the case while the second opening is connected to the blowing port of the ventilation device, and
      wherein an outer surface of the flow path component is held by the holding part provided in a different region from a region in which the first cover is provided; and
   a space formed by the outer surface of the flow path component, the inner surface of the case, and the holding part,
   wherein the holding part is formed in a frame shape for surrounding the space.

15. The projection type display device according to claim 14, further comprising:
   an optical engine for processing the light emitted from the light source;
   a connector holder for holding a connector to supply power to the light source;
   a support for supporting the ventilation device, the optical engine, and the connector holder; and
   a wall portion for holding the light source,
   wherein the optical engine, the connector holder, and the support include wall portions along a path along which air flows from the ventilation device, and
   wherein the flow path component is constructed by cylindrically connecting the wall portion for holding the light source, the wall portion of the optical engine, the wall portion of the connector holder, and the wall portion of the support.

16. The projection type display device according to claim 14, wherein the holding part is formed integrally with the case.

17. The projection type display device according to claim 14, wherein the opening for accessing the light source is positioned in a region of outside of the space surrounded by the holding part.

18. The projection type display device according to claim 14, wherein the space is sealed by the outer surface of the flow path component, the inner surface of the case, and the holding part.

19. The projection type display device according to claim 14, wherein the opening for accessing the light source is positioned in a region of outside of the space surrounded with the outer surface of the flow path component, the inner surface of the case, and the holding part.

20. The projection type display device according to claim 14, wherein the space is enclosed by the outer surface of the flow path component, the inner surface of the case, and the holding part such that, in a cross-sectional view, the holding part defines an upper wall of the space and a bottom wall of the space, and the outer surface of the flow path component and the inner surface of the case define side walls of the space extending between the upper wall of the space and the bottom wall of the space.

* * * * *